United States Patent
Kim et al.

(10) Patent No.: US 11,219,791 B2
(45) Date of Patent: Jan. 11, 2022

(54) SPRINKLER REDUCER FIXING APPARATUS

(71) Applicant: Joo Wan Kim, Seoul (KR)

(72) Inventors: Joo Wan Kim, Seoul (KR); Hyung Soo Kim, Seoul (KR)

(73) Assignee: Joo Wan Kim, Seoul (KR)

( * ) Notice: Subject to any disclaimer, the term of this patent is extended or adjusted under 35 U.S.C. 154(b) by 0 days.

(21) Appl. No.: 16/816,175

(22) Filed: Mar. 11, 2020

(65) Prior Publication Data

US 2021/0213315 A1     Jul. 15, 2021

(30) Foreign Application Priority Data

Jan. 14, 2020 (KR) .................. 10-2020-0004993

(51) Int. Cl.
*A62C 35/68* (2006.01)
*B05B 15/62* (2018.01)
*F16M 13/02* (2006.01)

(52) U.S. Cl.
CPC .............. *A62C 35/68* (2013.01); *B05B 15/62* (2018.02); *F16M 13/027* (2013.01)

(58) Field of Classification Search
CPC ....... A62C 35/68; F16M 13/027; B05B 15/62
See application file for complete search history.

(56) References Cited

U.S. PATENT DOCUMENTS

| | | | |
|---|---|---|---|
| 9,174,077 B2* | 11/2015 | Lim | A62C 35/68 |
| 9,255,652 B2* | 2/2016 | Kim | F16L 3/1075 |
| 9,341,286 B1* | 5/2016 | Oh | A62C 35/00 |
| 10,203,050 B2* | 2/2019 | Jung | F16L 3/003 |
| 2013/0048822 A1* | 2/2013 | Liu | A62C 35/68 248/316.5 |
| 2015/0360064 A1* | 12/2015 | Jung | F16L 3/1075 248/75 |
| 2016/0199680 A1* | 7/2016 | Jung | A62C 35/68 248/75 |

FOREIGN PATENT DOCUMENTS

KR     10-0822946 B1    4/2008

* cited by examiner

*Primary Examiner* — Anita M King
(74) *Attorney, Agent, or Firm* — Studebaker & Brackett PC (57) ABSTRACT

The present disclosure relates to is a sprinkler reducer fixing apparatus formed in a one-touch open bracket form and capable of easily fixing a reducer of a sprinkler. The apparatus includes at least a main frame including a first frame support portion, a sub-frame installed to be spaced at a certain interval from the main frame and including a second frame support portion, an intermediate frame installed between the main frame and the sub-frame, a shaft extending to pass through the main frame, the intermediate frame, and the sub-frame and having one end supported by the sub-frame, and a pivoting lever connected to the other end of the shaft, which protrudes from the main frame, and configured to pull and withdraw the other end of the shaft from the main frame by pivoting to decrease a distance between the main frame and the sub-frame.

9 Claims, 8 Drawing Sheets

FIG. 1

-- Prior Art --

SPRINKLER REDUCER FIXING APPARATUS

CROSS-REFERENCE TO RELATED APPLICATION

This application claims priority to and the benefit of Korean Patent Application No. 10-2020-0004993, filed on Jan. 14, 2020, the disclosure of which is incorporated herein by reference in its entirety.

BACKGROUND

1. Field of the Invention

The present invention relates to a sprinkler reducer fixing apparatus, and more particularly, to a sprinkler reducer fixing apparatus formed in a one-touch open bracket form and capable of easily fixing a reducer of a sprinkler.

2. Discussion of Related Art

Generally, as buildings have high stories and large sizes, a variety of fire-extinguishing apparatuses configured to effectively and efficiently extinguish fires when fires occur in buildings have been developed and used.

Accordingly, as new fire-extinguishing apparatuses have gradually been put to practical use and popularized, sprinklers capable of extinguishing fires by supplying and spraying high-pressure water have been installed mandatorily on ceiling parts of respective floors of a building to be used.

A main water pipe configured to supply water is installed inside a ceiling and sprinklers are coupled to connection pipes configured to connect the main water pipe to a plurality of branch water pipes to install the sprinklers as described above so as to extinguish fires by intensively supplying water to a place where fires occur.

Figure 1:
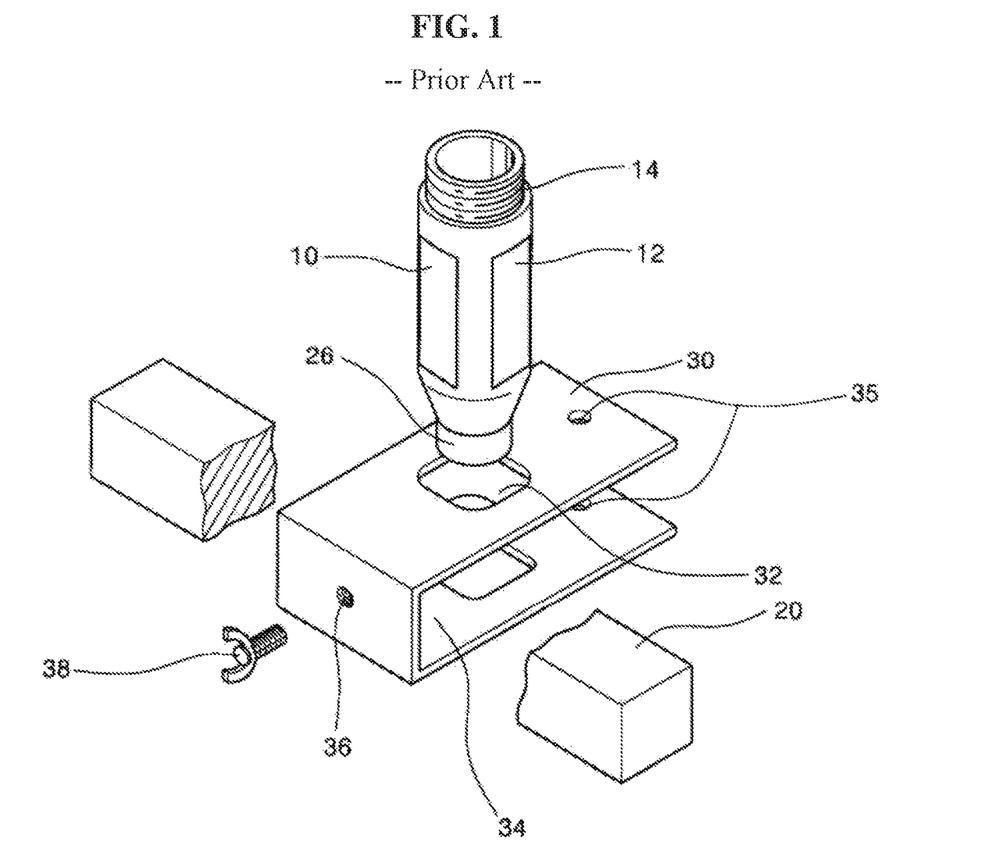
FIG. 1 is a perspective view illustrating an example of a conventional sprinkler reducer fixing apparatus.

FIG. 1 illustrates an example of a related art with respect to a reducer fixing structure. As shown in the drawing, according to the conventional reducer fixing structure, in a fire-extinguishing apparatus including a sprinkler connected to a reducer 10 below a general flexible joint to spray water to a certain place, a quadrangular insertion hole 32, into which contact surfaces 12 formed on four side portions of the reducer 10 are inserted, is formed. Here, a plurality of thumbscrews 38 are fastened to a certain number of screw holes 36 formed in a side portion of a reducer fixing bracket 30 having an opening portion 34, into which a quadrangular bar 20 is inserted, and pressurize the quadrangular bar 20 to pressurize the contact surfaces 12 of the reducer 10. Also, through holes 35 vertically penetrated are formed in side surfaces of the reducer fixing bracket 30 and fastened to screw supports withdrawn from a ceiling by an upper nut and a lower nut.

The contact surfaces 12 of the reducer 10 are formed by cutting a rounded part of an outer surface, and a sprinkler installation portion 26 on which a sprinkler head is installed is formed below and fixed to the reducer 10.

However, the conventional reducer fixing structure needs to pre-install a clamp into the quadrangular bar during a process of installing the quadrangular bar and to perform very complicated operations in installation and dissembling.

In addition, since the reducer is pressurized by only the thumbscrews pressurizing the quadrangular bar and receives a force only at one side, on a case by case basis, the reducer may be often detached from the clamp.

RELATED ART DOCUMENT

Patent Document

Patent Document 1: Korean Patent Registration No. 10-0822946 entitled, Device for fixing reducer of sprinkler

SUMMARY OF THE INVENTION

The present invention is directed to providing a sprinkler reducer fixing apparatus which is easily installed and disassembled and applicable to reducers having a variety of shapes or sizes.

According to one aspect of the present invention, there is provided a sprinkler reducer fixing apparatus fixed to a support frame of a ceiling structure and configured to fix a reducer of a sprinkler. The apparatus includes a main frame including a first frame support portion to be supported by the support frame, a sub-frame installed to be spaced at a certain interval from the main frame and including a second frame support portion capable of being supported by the support frame, an intermediate frame installed between the main frame and the sub-frame, a shaft extending to pass through the main frame, the intermediate frame, and the sub-frame and having one end supported by the sub-frame, and a pivoting lever connected to the other end of the shaft, which protrudes from the main frame, and configured to pull and withdraw the other end of the shaft from the main frame by pivoting to decrease a distance between the main frame and the sub-frame. Here, the intermediate frame has inclined contact surfaces coming into contact with the main frame and the sub-frame so as to allow the main frame and the sub-frame to be slidable by a certain distance in a longitudinal direction of the shaft along the contact surfaces of the intermediate frame when the shaft is pulled toward the other side through pivoting of the pivoting lever. Also, the reducer is located in an installation space formed between the support frame, the main frame, the sub-frame, and the intermediate frame.

The intermediate frame may have a triangular prism shape and both side surfaces coming into contact with the main frame and the sub-frame may be formed of inclined surfaces inclined downward as gradually extending outward from a center position of the intermediate frame along a longitudinal direction in which the shaft extends. Also, contact surfaces of the main frame and the sub-frame, which come into contact with the intermediate frame, may be formed to be inclined corresponding to the inclined surfaces of the intermediate frame.

The sprinkler reducer fixing apparatus may further include an elastic member which is installed to surround the shaft and has one end and the other end supported by the main frame and the sub-frame, respectively, to elastically support the main frame and the sub-frame to move in a direction of receding from each other.

The intermediate frame may further include a protruding step protruding from the contact surface coming into contact with the main frame by a certain length toward the main frame to be supported by an outer circumferential surface of the main frame.

The shaft may include a lever connection portion formed at one end protruding outward from the main frame to be connected to the pivoting lever and to extend to pass through the main frame, the intermediate frame, and the sub-frame, and include a screw thread formed at the other end protruding outward from the sub-frame. Also, a support screw may be fastened to the other end of the shaft, which protrudes outward from the sub-frame, and the support screw may be rotated to move forward or backward in a longitudinal direction of the shaft such that a fastening distance between the main frame and the sub-frame may be adjusted corresponding to a width or a diameter of the reducer supported between the main frame and the sub-frame.

The pivoting lever may be connected to a lever connection portion formed at one end of the shaft, which protrudes outward from the main frame, to be pivotable around a pivoting pin. A pin connection portion of the pivoting lever connected to the lever connection portion may include a pin hole which allows the pivoting pin to pass therethrough and have an outer circumferential surface coming into contact with an outer surface of the main frame. An outer circumferential surface of the pin connection portion, which comes into contact with the main frame, may be formed to gradually recede away from or move closer to the pin hole as extending from one side toward the other side along an outer circumferential surface such that one end of the shaft may enter an inside of the main frame when the pivoting lever pivots in a direction of receding from the main frame and the sub-frame and be withdrawn outward from the main frame when the pivoting lever pivots in a direction of moving closer to the main frame and the sub-frame.

A fixing ring including a fixing hole may be formed at an end of the pivoting lever, and the fixing ring may be configured to be fastened to the shaft such that the other end of the shaft, which protrudes from the sub-frame, may extend to pass through the fixing hole while the pivoting lever has rotated to allow the main frame and the sub-frame to move closer to each other in order to fix the reducer.

The main frame may include a first frame connection portion including a first shaft through hole formed to allow the shaft to pass therethrough and configured to come into contact with the intermediate frame, a first support body which extends from the first frame connection portion and supports the reducer, and the first frame support portion formed at an end of the first support body. Here, the first frame support portion may include a first extending plate extending from a top surface of the first support body to cover a top surface of the support frame, a first side plate extending downward from an end of the first extending plate to be supported by a side surface of the support frame, and a holding step protruding from a bottom end of the first side plate by a certain length to be supported by a bottom surface of the support frame. Also, the sub-frame may include a second frame connection portion including a second shaft through hole formed to allow the shaft to pass therethrough and configured to come into contact with the intermediate frame, a second support body which extends from the second frame connection portion and supports the reducer, and the second frame support portion formed at an end of the second support body. Here, the second frame support portion may include a second extending plate extending from a top surface of the second support body to cover the top surface of the support frame and a second side plate extending downward from an end of the second extending plate to be supported by the side surface of the support frame.

The sub-frame may be connected to the intermediate frame to be rotatable around the shaft to easily mount the reducer while the first frame support portion of the main frame is held by the support frame.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a sprinkler reducer fixing apparatus according to an embodiment of the present invention will be described in detail with reference to the attached drawings. Since the present invention may be variously modified and have a variety of forms, particular embodiments will be illustrated in the drawings and described in detail in the text. However, these are not intended to limit the present invention to a particularly disclosed form and it should be understood that the present invention includes all changes, equivalents, and substitutes included within the concept and technical scope of the present invention. In a description on each drawing, like elements will be referred to as like reference numerals. In the attached drawings, for clarity of the present invention, sizes of structures are exaggerated than they are.

The terms such as first, second, and the like may be used to describe a variety of components, but the components are not limited to the terms. The terms are used only for distinguishing one component from another. For example, without departing from the scope of the present invention, a first component may be referred to as a second component, and similarly, the second component may be referred to as the first component.

The terms used herein are used merely for describing particular embodiments and are not intended to limit the present invention. Singular expressions, unless clearly defined otherwise in context, include plural expressions. Throughout the application, the terms "comprise," "have," or the like are used herein to specify the presence of stated features, numbers, stages, operations, elements, components or combinations thereof but do not preclude the presence or addition of one or more other features, numbers, stages, operations, elements, components, or combinations thereof.

Unless otherwise defined, all terms used herein including technical or scientific terms have the same meanings as those generally understood by one of ordinary skill in the art to which the present invention pertains. The terms as defined in generally used dictionaries should be understood as having meanings which coincide with contextual meanings of related art and will not be understood as ideally or excessively formal meanings unless clearly defined in the present application.

FIGS. 2 to 7 illustrate an exemplary embodiment of a sprinkler reducer fixing apparatus 100 according to the present invention.

Figure 2:
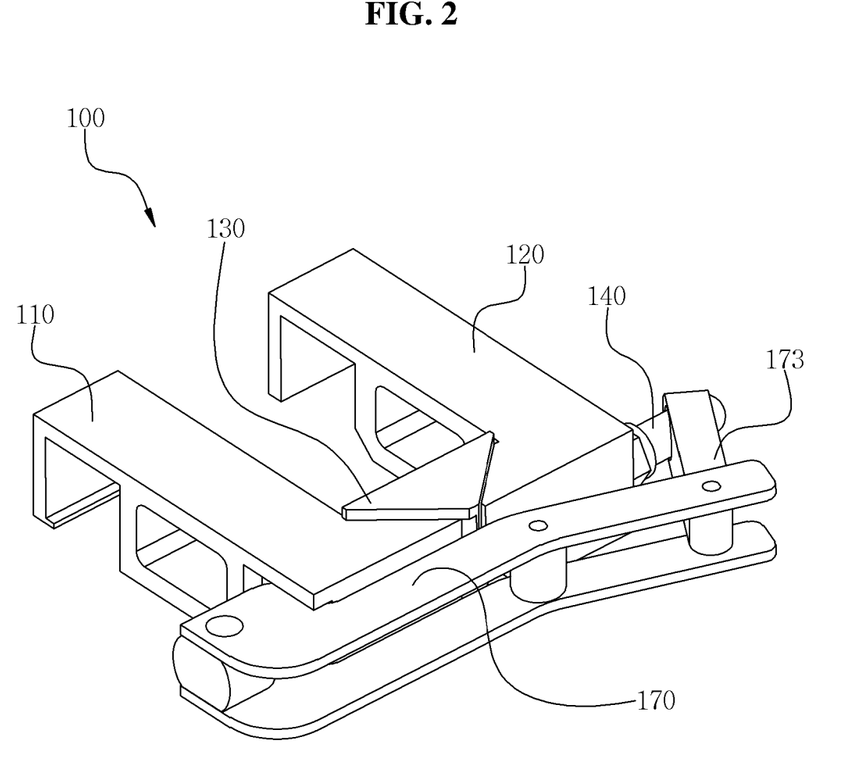
FIG. 2 is a perspective view illustrating an embodiment of a sprinkler reducer fixing apparatus according to the present invention.
Figure 3:
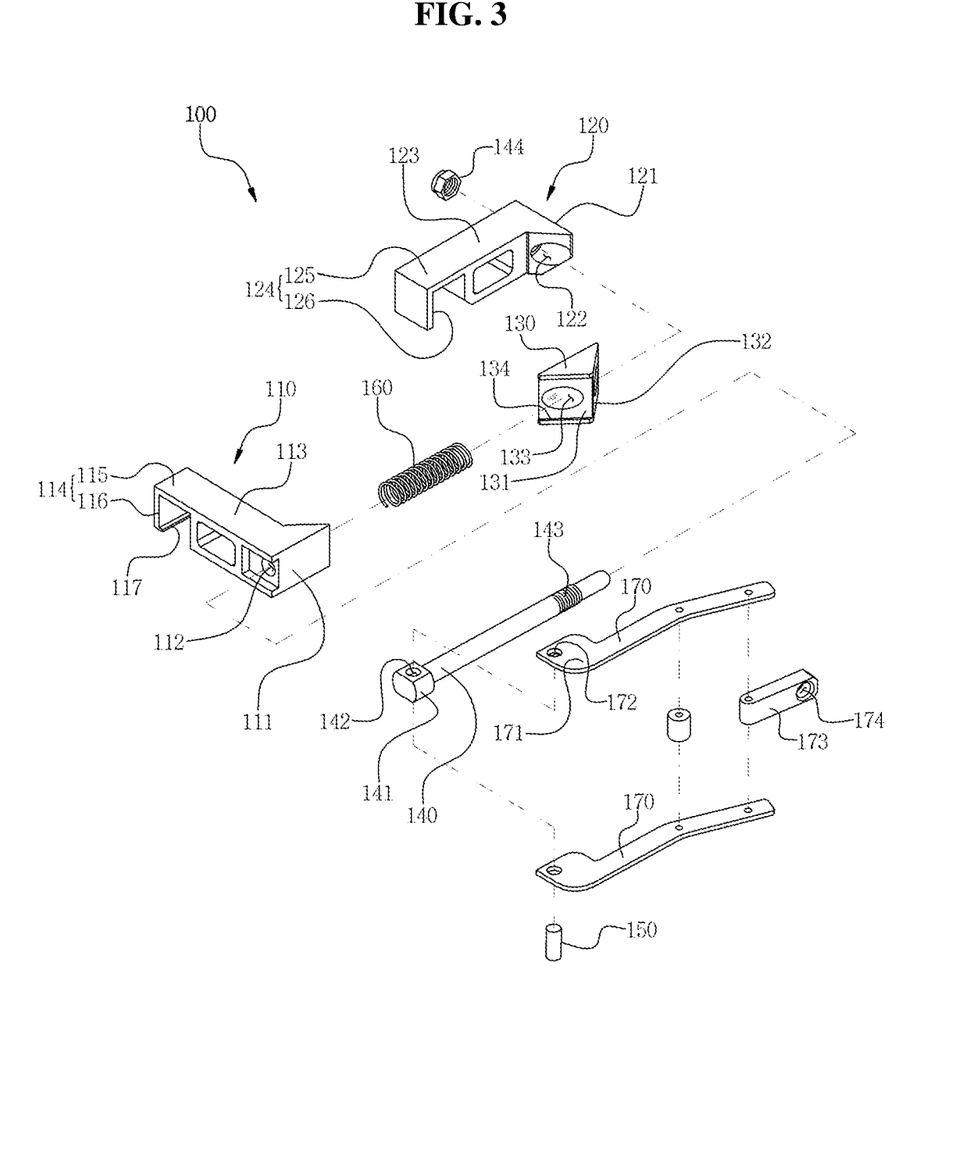
FIG. 3 is an exploded perspective view of the sprinkler reducer fixing apparatus shown in FIG. 2.

Referring to the drawings, the sprinkler reducer fixing apparatus 100 includes a main frame 110 and a sub-frame 120 installed to be spaced at a certain interval apart from each other and supported by a support frame 20 of a ceiling structure, an intermediate frame 130 installed between the main frame 110 and the sub-frame 120, a shaft 140 extending to pass through the main frame 110, the intermediate frame 130, and the sub-frame 120, an elastic member 160 surrounding the shaft 140 and having one end and the other end supported by the main frame 110 and the sub-frame 120, respectively, to support the main frame 110 and the sub-frame 120 to be elastically biased in a direction of receding from each other, and a pivoting lever 170 connected to one end of the shaft 140 and configured to drive the main frame 110 and the sub-frame 120 to be closer to each other by pulling one side of the shaft 140 or to release a restriction force.

The main frame 110 includes a first frame connection portion 111, a first support body 113 extending from the first frame connection portion 111, and a first frame support portion 114 formed at an end of the first support body 113.

The first frame connection portion 111 is a part connected to the intermediate frame 130 which will be described below and includes a first shaft through hole 112. The first shaft through hole 112 is formed to allow the shaft 140, which will be described below, to pass therethrough.

When a part of the first frame connection portion 111 coming into contact with the intermediate frame 130, which will be described below, is referred to as an inside and another part opposite thereto is referred to as an outside, the first shaft through hole 112 includes a first section extending inward by a certain length from an outer surface of the first frame connection portion 111 and a second section extending from an end of the first section toward an inner surface of the first frame connection portion 111 while a diameter of the second section is relatively greater than that of the first section. The first section includes a hole having a diameter corresponding to an outer diameter of the shaft 140 while the second section has a diameter corresponding to an outer diameter of the elastic member 160 surrounding to the shaft 140. Due to a difference in the diameters of the first section and the second section as described above, a support step (not shown) supporting an end of the elastic member 160 is formed at a connection portion to which the first section and the second section are connected.

The first frame connection portion 111 has an inner surface formed to be inclined corresponding to a shape of the intermediate frame 130 which will be described below. The first support body 113 extends from the first frame connection portion 111 along a direction intersecting with a longitudinal direction of the shaft 140. The first support body 113 supports a side surface of the reducer 10 when the reducer 10 is installed.

The first frame support portion 114 is a part connected to the support frame 20 and includes a first extending plate 115 extending from a top surface of the first support body 113, a first side plate 116 extending downward from an end of the first extending plate 115, and a holding step 117 formed at a bottom end of the first side plate 116.

Since the first extending plate 115 is formed to have a length corresponding to a width of the support frame 20, the support frame 20 is fastened between a cross section of the first support body 113 and the first side plate 116.

Also, since the first frame support portion 114 includes the holding step 117, the main shaft 140 may be held by the support frame first and then an operation may be performed while a reducer is mounted on the spot such that working efficiency is high.

The sub-frame 120 is formed to have a form similar to that of the main frame 110.

The sub-frame 120 is installed to be spaced at a certain distance from the main frame 110 and includes a second frame connection portion 121 connected to the intermediate frame 130, which will be described below, a second support body 123 extending from the second frame connection portion 121, and a second frame support portion 124 connected to an end of the second support body 123.

When one side of the second frame connection portion 121 which comes into contact with the intermediate frame 130 is referred to as an inside and the other side opposite thereto is referred to as an outside, a second shaft through hole 122 is formed at the second frame connection portion 121 to pass through an inner surface and an outer surface thereof so as to allow the shaft 140 to extend. The second shaft through hole 122, like the first shaft through hole 112, includes a first section recessed inward by a certain length from the outer surface and a second section formed at an end of the first section and configured to pass through the inner surface. Here, the first section has a diameter corresponding to the outer diameter of the shaft 140 and the second section has a diameter corresponding to the outer diameter of the elastic member 160.

The second frame connection portion 121 has an inner surface which comes into contact with the intermediate frame 130 and is formed to be inclined at a certain angle corresponding to the shape of the intermediate frame 130 which will be described below.

The second support body 123 has the same shape as that of the first support body 113, and the second frame support portion 124 includes a second extending plate 125 and a second side plate 126. The second extending plate 125 is installed to cover a top surface of the support frame 20 and the second side plate 126 is installed to cover a side surface of the support frame 20. Here, unlike the first side plate 116, a component corresponding to the holding step 117 is not provided at the second side plate 126.

Figure 6:
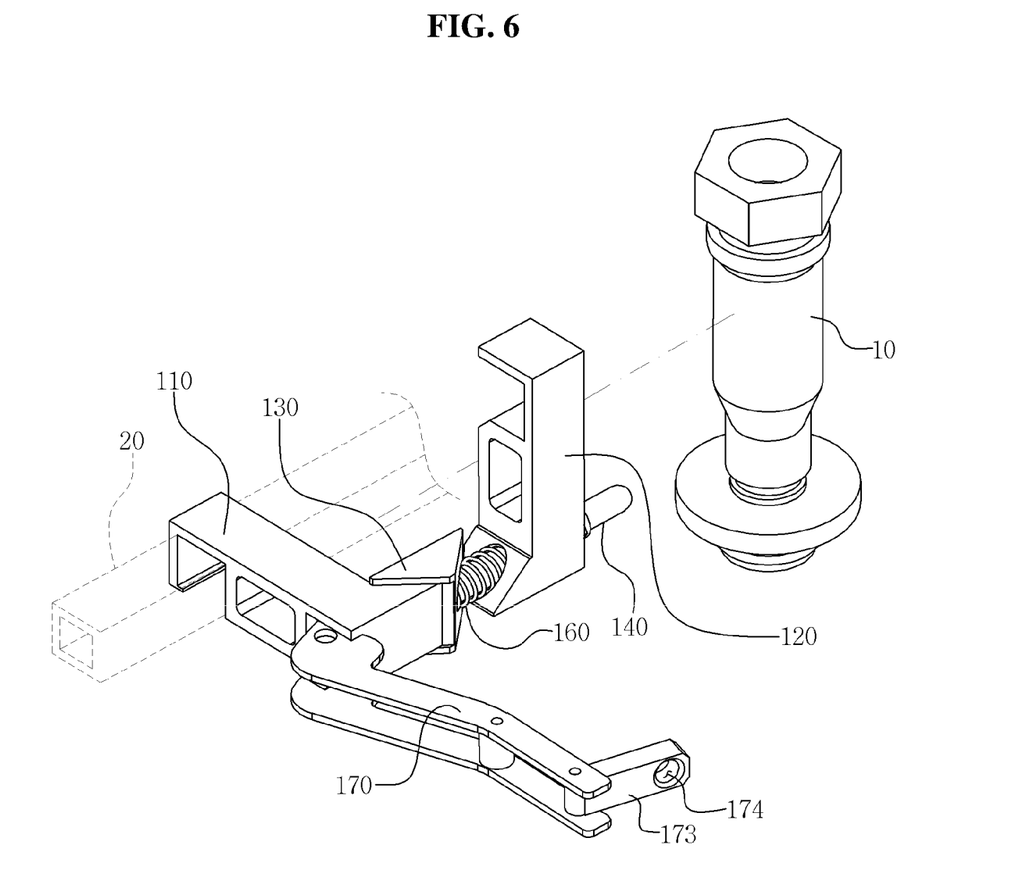
FIG. 6 is a perspective view illustrating a state in which the sprinkler reducer fixing apparatus of FIG. 2 is fastened to a support frame and a sub-frame pivots to mount a reducer.

The sub-frame 120 may pivot such that the second frame support portion 124 extends upward centering on the shaft 140 which will be described below while the main frame 110 is held by the support frame 20. The pivoting of the sub-frame 120 is to form an entry path capable of allowing a reducer 10 to be mounted to enter a space between the first support body 113 and the second support body 123.

The intermediate frame 130 has a triangular prism shape and includes a first incline portion 131, which comes into contact with the first frame connection portion 111 of the main frame 110, and a second incline portion 132 which comes into contact with the second frame connection portion 121 of the sub-frame 120.

Protruding steps 134 protruding by a certain length toward the main frame 110 are formed on both edges of the first incline portion 131 in order to allow the sub-frame 120 to be held by the main frame 110 not to pivot with the sub-frame 120 when the sub-frame 120 pivots to mount the reducer 10.

The intermediate frame 130 includes a third shaft through hole 133, through which the shaft 140 and the elastic member 160 are able to pass, and has a diameter corresponding to the outer diameter of the elastic member 160.

Figure 4:
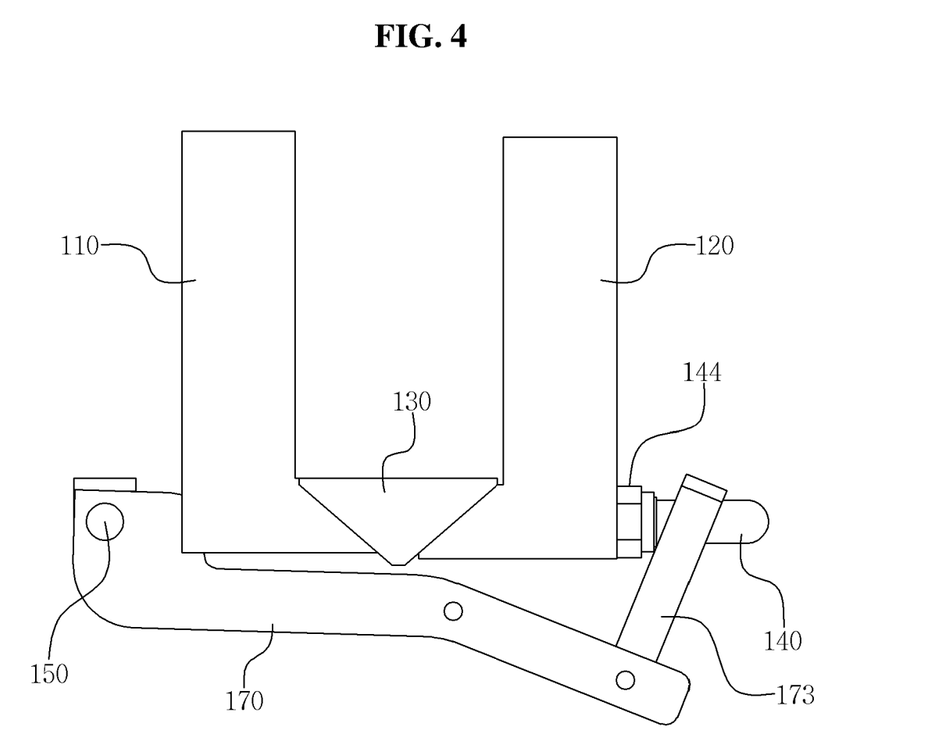
FIG. 4 is a plan view illustrating a state in which the sprinkler reducer fixing apparatus of FIG. 2 is locked.
Figure 5:
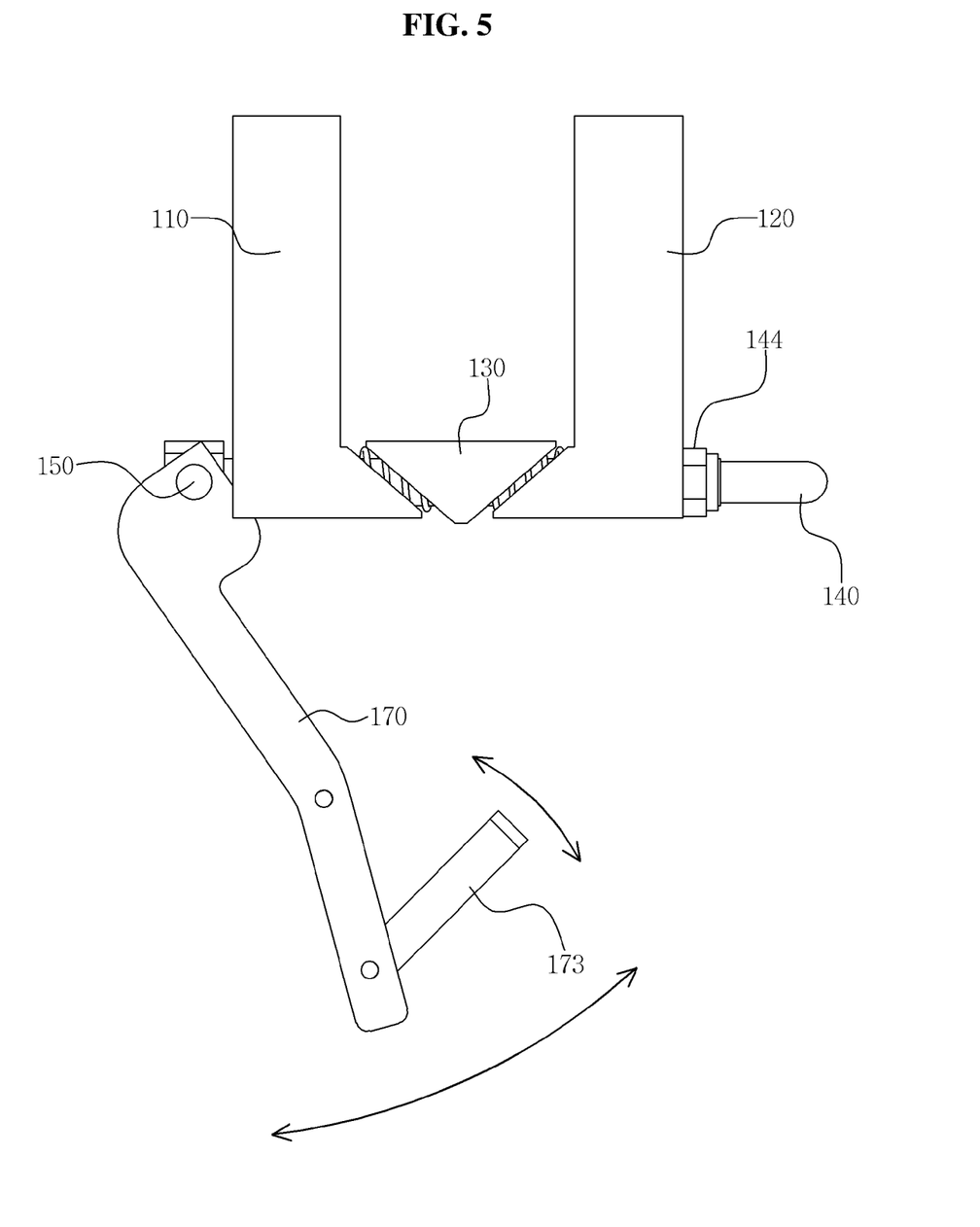
FIG. 5 is a plan view illustrating a state in which the sprinkler reducer fixing apparatus of FIG. 2 is unlocked.

Since the intermediate frame 130 is connected to the main frame 110 and the sub-frame 120 at the first incline portion 131 and the second incline portion 132 to come into contact with inclined surfaces, the main frame 110 and the sub-frame 120 may move along the inclined surfaces of the first incline portion 131 and the second incline portion 132 so as to be movable along a direction in which a mutual interval decreases or increases.

As described above, the shaft 140 extends while passing through the first shaft through hole 112 of the main frame 110, the third shaft through hole 133 of the intermediate frame 130, and the second shaft through hole 122 of the sub-frame 120.

A lever connection portion 141 connected to the pivoting lever 170, which will be described below, is formed at one end of the shaft 140 protruding outward from the main frame 110, and a screw thread 143 is formed at the other end protruding outward from the sub-frame 120.

The lever connection portion 141 includes a first pin hole 142 to be connectable with the pivoting lever 170 using a pivoting pin 150. Also, a support screw 144 is fastened to the other end of the shaft 140 protruding outward from the sub-frame 120. Here, when a distance between the main frame 110 and the sub-frame 120 decreases due to the pivoting lever 170 which will be described below, the distance may be adjusted by adjusting a position at which the support screw 144 is fastened to the shaft 140 through pivoting of the support screw 144. This is to adjust the distance between the main frame 110 and the sub-frame 120 according to a size of the reducer 10.

The elastic member 160 is a compression spring installed to surround the shaft 140, and one and the other end thereof are supported by the main frame 110 and the sub-frame 120, respectively. Then, when the main frame 110 and the sub-frame 120 are moved by the pivoting lever 170, which will be described below, to be closer to each other, the elastic member 160 is compressed. When a pressure is released by pivoting of the pivoting lever 170, the main frame 110 and the sub-frame 120 are moved by an elastic force of the elastic member 160 in a direction of being departed from each other and holding of the reducer 10 is released.

The pivoting lever 170 is, as described above, pivotably connected to the lever connection portion 141 formed at an end of one side of the shaft 140. The pivoting lever 170 includes a second pin hole 172 corresponding to the first pin hole 142 and the pivoting pin 150 is fastened thereto to pass through the second pin hole 172 and the first pin hole 142 such that the pivoting lever 170 may rotate around the pivoting pin 150.

In addition, a pin connection portion 171, in which the second pin hole 172 is formed to be connected to the lever connection portion 141, is formed such that an outer circumferential surface thereof comes into contact with an outer surface of the main frame 110 and a distance from the second pin hole 172 gradually increases as the outer circumferential surface of the pin connection portion 171 further extends from one side to the other side. That is, as an angle formed by a direction in which the pivoting lever 170 extends and a direction in which the shaft 140 extends increases, a spaced distance between the outer circumferential surface of the pin connection portion 171, which comes into contact with the main frame 110, and the second pin hole 172 decreases. On the other hand, as the angle formed by the direction in which the pivoting lever 170 extends and the direction in which the shaft 140 extends decreases, the distance between the outer circumferential surface of the pin connection portion 171, which comes into contact with the main frame 110, and the second pin hole 172 increases. Accordingly, when the pivoting lever 170 is rotated to be close to the main frame 110 and the sub-frame 120, the second pin hole 172 to which the pivoting pin 150 is connected recedes from the main frame 110 such that an end of one side of the shaft 140 moves in a direction of receding from the main frame 110.

In addition, a fixing ring 173 is formed at an end of the pivoting lever 170 and is to be fastened to an end of the other side of the shaft 140.

Figure 7:
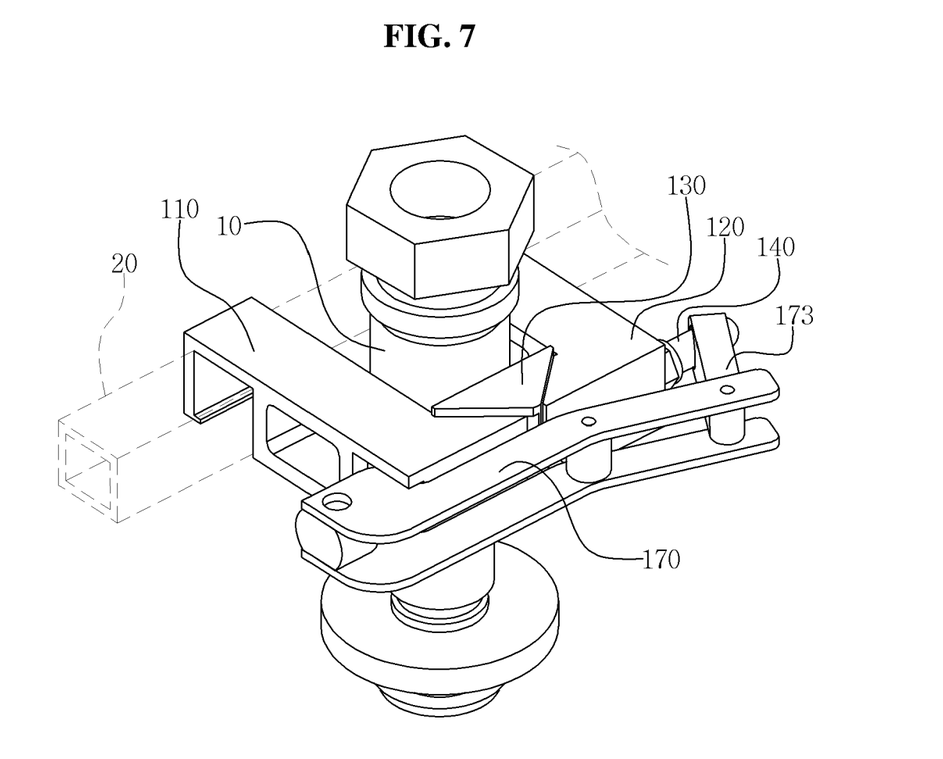
FIG. 7 is a perspective view illustrating a state in which the reducer is fastened by the sprinkler reducer fixing apparatus.

The fixing ring 173 includes a fixing hole 174 into which the end of the other side of the shaft 140 is insertable. Here, while the pivoting lever 170 pivots in a direction of being closer to the main frame 110 and the sub-frame 120 so as to allow the reducer 10 to be held between the main frame 110 and the sub-frame 120, the fixing ring 173 is held by the end of the shaft 140 protruding outward from the sub-frame 120 such that the pivoting lever 170 may be fixed not to be released from bonding with the reducer 10 while rotating.

Figure 8:
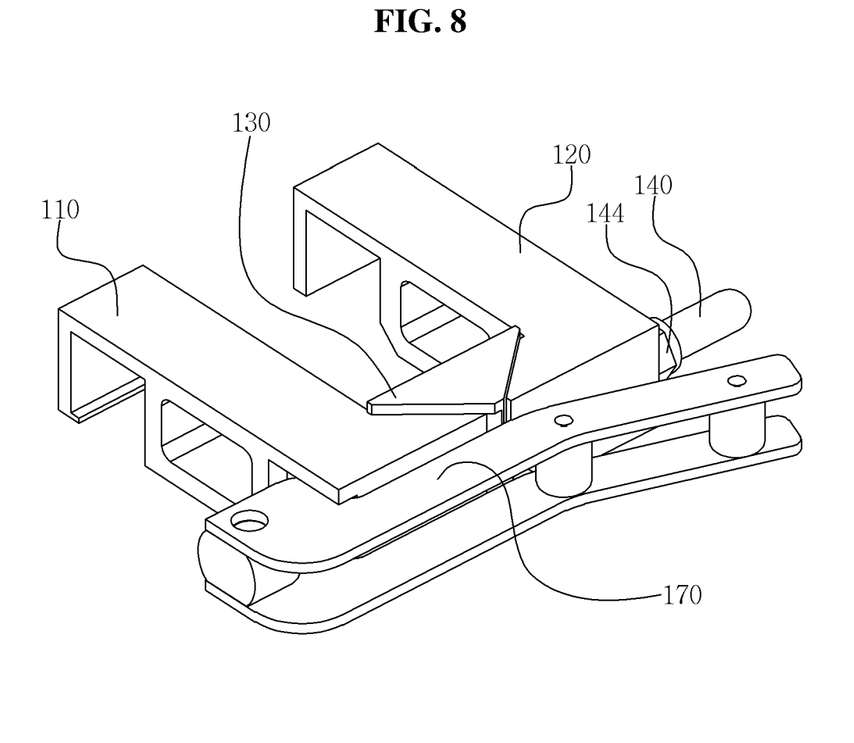
FIG. 8 is a perspective view of another embodiment of the sprinkler reducer fixing apparatus without a fixing ring.

The fixing ring 173 may be omitted as shown in FIG. 8.

A process of mounting the above-described sprinkler reducer fixing apparatus 100 according to the present invention will be descried as follows with reference to FIGS. 6 and 7.

First, as shown in FIG. 6, the first frame support portion 114 of the main frame 110 is mounted to be held by the support frame 20. Here, since the holding step 117 of the first frame support portion 114 is held by a bottom end of the support frame 20, a connected state may be maintained.

In this state, the end of the sub-frame 120 pivots on the shaft 140 to face upward to secure the entry path through which the reducer 10 enters a space between the main frame 110 and the sub-frame 120 such that the reducer 10 enters the space. Then the sub-frame 120 is rotated again to be mounted so as to fasten the second frame support portion 124 to the support frame 20.

When the pivoting lever 170 is rotated to extend in a direction parallel to the shaft 140 while the reducer 10 is located between the main frame 110 and the sub-frame 120, the end of one side of the shaft 140 is withdrawn from the main frame 110 such that the distance between the main frame 110 and the sub-frame 120 decreases. Accordingly, four sides of the reducer 10 are supported and bound by the support frame 20, the main frame 110, the intermediate frame 130, and the sub-frame 120.

After binding, the fixing ring 173 is held by the end of the shaft 140 protruding outward from the sub-frame 120 and fixes the pivoting lever 170.

Afterward, when it is necessary to release binding of the reducer 10 such as adjusting a mounting position or repairing, a withdrawal of the shaft 140 is released by rotating the pivoting lever 170 such that the main frame 110 and the sub-frame 120 are spaced apart by the elastic member 160 and the binding of the reducer 10 is released.

According to the embodiment of the present invention, a structure of a sprinkler reducer fixing apparatus may be easily dissembled, reinstalled, and changed in position after installation and a fixing width of a fixed clamp may be easily adjusted according to a size of a reducer so as to provide advantages of high convenience in use on the spot and reducing an installation time.

The description of the disclosed embodiments is provided to allow one of ordinary skill in the art to utilize or perform the present invention. A variety of modifications of the embodiments are apparent to one of ordinary skill in the art, and general principles defined herein are applicable to other embodiments without departing from the scope of the present invention. Therefore, the present invention should not be limited to the embodiments provided herein and be construed within the broadest scope consistent to the principles and novel features provided herein.

What is claimed is:

1. A sprinkler reducer fixing apparatus fixed to a support frame of a ceiling structure and configured to fix a reducer of a sprinkler, the apparatus comprising:
   a main frame comprising a first frame support portion to be supported by the support frame;
   a sub-frame installed to be spaced at a certain interval from the main frame and comprising a second frame support portion capable of being supported by the support frame;
   an intermediate frame installed between the main frame and the sub-frame;
   a shaft extending to pass through the main frame, the intermediate frame, and the sub-frame and having one end supported by the sub-frame; and
   a pivoting lever connected to the other end of the shaft, which protrudes from the main frame, and configured to pull and withdraw the other end of the shaft from the main frame by pivoting to decrease a distance between the main frame and the sub-frame,
   wherein the intermediate frame has inclined contact surfaces coming into contact with the main frame and the sub-frame so as to allow the main frame and the sub-frame to be slidable by a certain distance in a longitudinal direction of the shaft along the contact surfaces of the intermediate frame when the shaft is pulled toward the other side through pivoting of the pivoting lever, and
   wherein the reducer is located in an installation space formed between the support frame, the main frame, the sub-frame, and the intermediate frame.

2. The sprinkler reducer fixing apparatus of claim 1, wherein the intermediate frame has a triangular prism shape and both side surfaces coming into contact with the main frame and the sub-frame are formed of inclined surfaces inclined downward as gradually extending outward from a center position of the intermediate frame along a longitudinal direction in which the shaft extends, and
   wherein contact surfaces of the main frame and the sub-frame, which come into contact with the intermediate frame, are formed to be inclined corresponding to the inclined surfaces of the intermediate frame.

3. The sprinkler reducer fixing apparatus of claim 1, further comprising an elastic member which is installed to surround the shaft and has one end and the other end supported by the main frame and the sub-frame, respectively, to elastically support the main frame and the sub-frame to move in a direction of receding from each other.

4. The sprinkler reducer fixing apparatus of claim 2, wherein the intermediate frame further comprises a protruding step protruding from the contact surface coming into contact with the main frame by a certain length toward the main frame to be supported by an outer circumferential surface of the main frame.

5. The sprinkler reducer fixing apparatus of claim 1, wherein the shaft comprises a lever connection portion formed at one end protruding outward from the main frame to be connected to the pivoting lever and to extend to pass through the main frame, the intermediate frame, and the sub-frame, and comprises a screw thread formed at the other end protruding outward from the sub-frame, and
   wherein a support screw is fastened to the other end of the shaft, which protrudes outward from the sub-frame, and the support screw is rotated to move forward or backward in a longitudinal direction of the shaft such that a fastening distance between the main frame and the sub-frame is adjusted corresponding to a width or a diameter of the reducer supported between the main frame and the sub-frame.

6. The sprinkler reducer fixing apparatus of claim 1, wherein the pivoting lever is connected to a lever connection portion formed at one end of the shaft, which protrudes outward from the main frame, to be pivotable around a pivoting pin,
   wherein a pin connection portion of the pivoting lever connected to the lever connection portion comprises a pin hole which allows the pivoting pin to pass therethrough and has an outer circumferential surface coming into contact with an outer surface of the main frame, and
   wherein the outer circumferential surface of the pin connection portion, which comes into contact with the main frame, is formed to gradually recede away from or move closer to the pin hole as extending from one side toward the other side along an outer circumferential surface such that one end of the shaft enters an inside of the main frame when the pivoting lever pivots in a direction of receding from the main frame and the sub-frame and is withdrawn outward from the main frame when the pivoting lever pivots in a direction of moving closer to the main frame and the sub-frame.

7. The sprinkler reducer fixing apparatus of claim 6, wherein a fixing ring comprising a fixing hole is formed at an end of the pivoting lever, and
   wherein the fixing ring is configured to be fastened to the shaft such that the other end of the shaft, which protrudes from the sub-frame, extends to pass through the fixing hole while the pivoting lever has rotated to allow the main frame and the sub-frame to move closer to each other in order to fix the reducer.

8. The sprinkler reducer fixing apparatus of claim 1, wherein the main frame comprises:
   a first frame connection portion comprising a first shaft through hole formed to allow the shaft to pass therethrough and configured to come into contact with the intermediate frame;
   a first support body which extends from the first frame connection portion and supports the reducer; and
   the first frame support portion formed at an end of the first support body,
   wherein the first frame support portion comprises a first extending plate extending from a top surface of the first support body to cover a top surface of the support frame, a first side plate extending downward from an end of the first extending plate to be supported by a side surface of the support frame, and a holding step protruding from a bottom end of the first side plate by a certain length to be supported by a bottom surface of the support frame,
   wherein the sub-frame comprises:
   a second frame connection portion comprising a second shaft through hole formed to allow the shaft to pass therethrough and configured to come into contact with the intermediate frame;
   a second support body which extends from the second frame connection portion and supports the reducer; and
   the second frame support portion formed at an end of the second support body, and wherein the second frame support portion comprises a second extending plate extending from a top surface of the second support body to cover the top surface of the support frame and a second side plate extending downward from an end of the second extending plate to be supported by the side surface of the support frame.

9. The sprinkler reducer fixing apparatus of claim 8, wherein the sub-frame is connected to the intermediate frame to be rotatable around the shaft to easily mount the reducer while the first frame support portion of the main frame is held by the support frame.

* * * * *